United States Patent
Vempati et al.

(10) Patent No.: US 9,146,921 B1
(45) Date of Patent: Sep. 29, 2015

(54) ACCESSING A FILE SYSTEM DURING A FILE SYSTEM CHECK

(71) Applicant: EMC Corporation, Hopkinton, MA (US)

(72) Inventors: Srinivasa Rao Vempati, Upton, MA (US); Dixit Patel, Monroe, NJ (US); Jean-Pierre Bono, Westborough, MA (US); Ming Yang, Shanghai (CN); Praveen Solanki, Brighton, MA (US)

(73) Assignee: EMC Corporation, Hopkinton, MA (US)

(*) Notice: Subject to any disclaimer, the term of this patent is extended or adjusted under 35 U.S.C. 154(b) by 161 days.

(21) Appl. No.: 13/832,705

(22) Filed: Mar. 15, 2013

(51) Int. Cl.
*G06F 17/30* (2006.01)
*G06F 12/02* (2006.01)

(52) U.S. Cl.
CPC .......... *G06F 17/30008* (2013.01); *G06F 12/02* (2013.01); *G06F 12/0292* (2013.01)

(58) Field of Classification Search
CPC .............................. G06F 12/06; G06F 12/0292
USPC ........... 707/690, 691, 781, 821; 711/100, 111
See application file for complete search history.

(56) References Cited

U.S. PATENT DOCUMENTS

| | | | |
|---|---|---|---|
| 8,577,855 B2 | 11/2013 | Shyam et al. | |
| 8,843,533 B1 | 9/2014 | Sukumar et al. | |
| 2005/0193245 A1* | 9/2005 | Hayden et al. | 714/13 |
| 2005/0273570 A1* | 12/2005 | DeSouter et al. | 711/203 |
| 2008/0222087 A1* | 9/2008 | Balmin et al. | 707/2 |
| 2008/0222152 A1* | 9/2008 | Godbole | 707/8 |
| 2012/0117035 A1 | 5/2012 | Ranade et al. | |

OTHER PUBLICATIONS

Maohua Lu et al., An Incremental File System Consistency Checker for Block-Level CDP Systems, 2008, IEEE, 157-162.*

* cited by examiner

*Primary Examiner* — Jean B Fleurantin
(74) *Attorney, Agent, or Firm* — BainwoodHuang

(57) ABSTRACT

An improved technique involves providing read-only access to the file system while FSCK is running. After a storage processor detects corrupted data in the file system, the storage processor brings the file system offline and provides FSCK with read-only access to the file system. The storage processor then begins a repair process on the disk by starting to run FSCK, which writes corrupted blocks to a secondary storage device. Upon receiving a request from a user for access to a file in the file system, the storage processor mounts the file system with read-only access. Upon completion of FSCK, the storage processor brings the file system offline, applies the corrected blocks from secondary storage to the blocks in primary storage, and brings the file system online with full read and write access.

23 Claims, 5 Drawing Sheets

ACCESSING A FILE SYSTEM DURING A FILE SYSTEM CHECK

BACKGROUND

Storage systems use file systems for organizing files stored on disks or flash drives in the storage system. Some file systems have an associated inode table, which serves as an index to inodes, which in turn store block locations on the disks where the files of the file system are stored, as well as metadata associated with those files. A directory is a table providing a mapping between a filename for a file and the location of the inode of the file; the directory may also contain subdirectories. This mapping is encapsulated in a directory entry for the file, which stores both the filename of the file and an inode number. The inode number uniquely identifies the file and provides the location of the content of the file on disk. When a client requests access to the file in a directory, the file system looks up a directory entry for the file and obtains the inode number.

Occasionally, files stored on the disks become corrupted. One cause of corruption is that metadata associated with the files is either erased or has failed to update along with changes in the content of the files. Consequences of corruption include an inability to access the affected files. File systems such as Network File System (NFS) allow a storage controller to detect such corruptions and repair them.

A common tool for such repairs is a utility known as File System Check (FSCK), which searches through the inodes in a file system and performs consistency checks on metadata in those inodes.

SUMMARY

It should be understood that, while FSCK is being run, a user cannot be allowed to write to blocks that are being repaired, as such an action will stymie the repair effort. A conventional procedure for repairing corrupted data in a file system then involves bringing the file system offline. In this way, the storage controller may run FSCK successfully with little risk of conflicting data being introduced by a user.

Unfortunately, there are deficiencies with that conventional procedure for repairing corrupted data in a file system. For example, FSCK may run for many hours in the course of a repair. Such a lengthy repair requires the file system to be off-line for that amount of time, which implies that users are unable to access files in the file system for hours at a time—an unacceptable proposition in many cases.

In contrast to the conventional procedure for repairing corrupted data in a file system which causes files in the file system to become inaccessible for a long time, an improved technique involves providing read-only access to the file system while FSCK is running. After a storage processor detects corrupted data in the file system, the storage processor brings the file system offline and provides FSCK with read-only access to the file system. The storage processor then begins a repair process on the disk by starting to run FSCK, which writes corrupted blocks to a secondary storage device. Upon receiving a request from a user for access to a file in the file system, the storage processor mounts the file system with read-only access.

Advantageously, the improved technique allows for users to have access to the files in the file system while FSCK runs, but in such a way that the users cannot interfere with the repair process.

One embodiment of the improved technique is directed to a method of repairing corrupted data in a file system of a primary storage device in response to detecting the corrupted data. The method includes bringing the file system offline upon detecting the corrupted data in the file system. The method also includes invoking a repair operation with a read-only access to the file system, repairs made to corrupted data during the repair process being made on a secondary storage device. The method further includes receiving a request from a user to access a particular file in the file system. The method further includes performing a mounting operation that serves to provide the user read-only access to the file system upon receipt of the request.

Additionally, some embodiments of the improved technique are directed to a system constructed and arranged to repair corrupted data in a file system of a primary storage device in response to detecting the corrupted data. The system includes a network interface, memory, and a controller including controlling circuitry constructed and arranged to carry out the method of repairing corrupted data in a file system of a primary storage device in response to detecting the corrupted data.

Furthermore, some embodiments of the improved technique are directed to a computer program product having a non-transitory computer readable storage medium which stores code including a set of instructions which, when executed by the computer, carry out the method of repairing corrupted data in a file system of a primary storage device in response to detecting the corrupted data.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves providing read-only access to the file system while FSCK is running. After a storage processor detects corrupted data in the file system, the storage processor brings the file system offline and provides FSCK with read-only access to the file system. The storage processor then begins a repair process on the disk by starting to run FSCK, which writes corrupted blocks to a secondary storage device. Upon receiving a request from a user for access to a file in the file system, the storage processor mounts the file system with read-only access.

Advantageously, the improved technique allows for users to have access to the files in the file system while FSCK runs, but in such a way that the users cannot interfere with the repair process.

Figure 1:
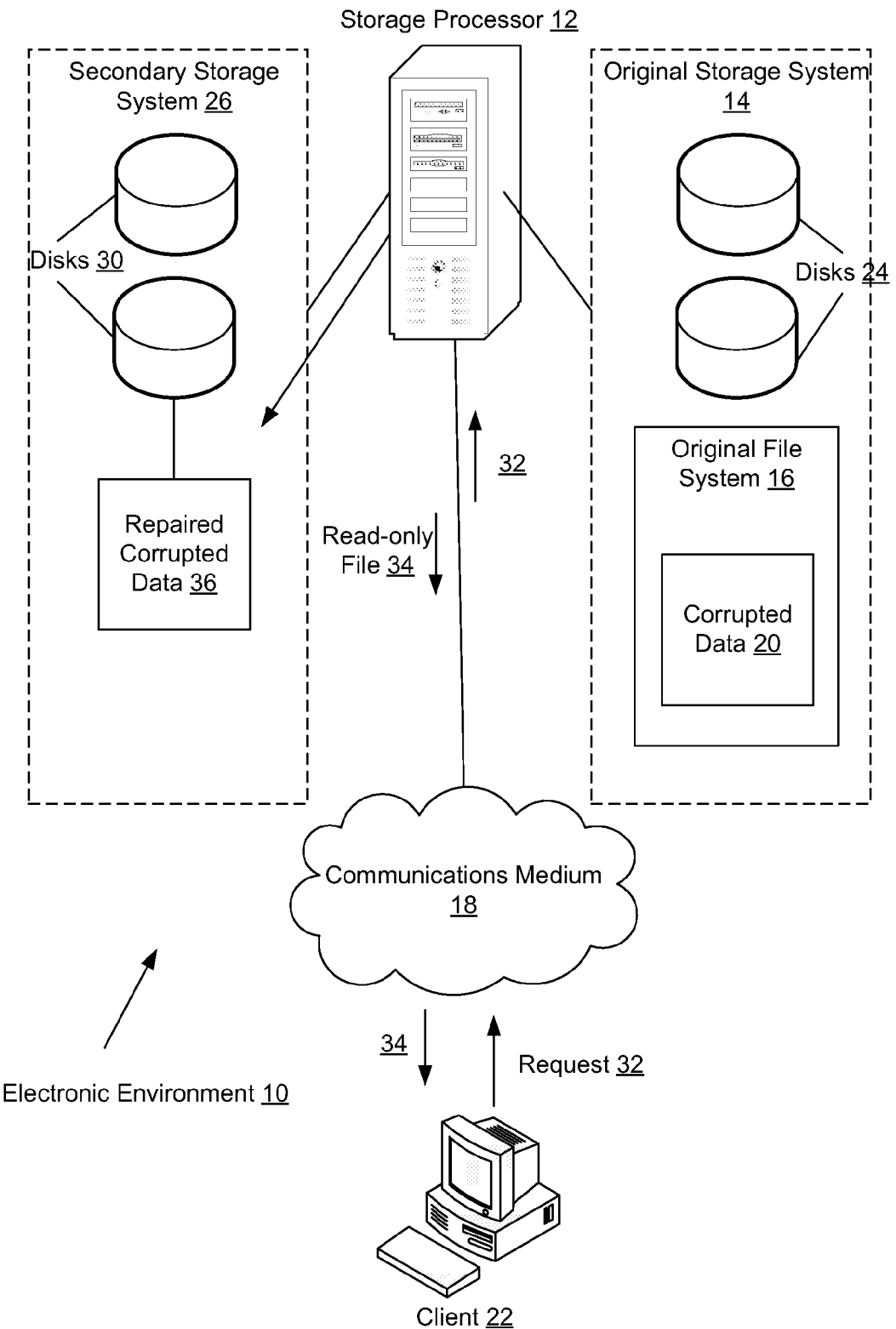
FIG. 1 is a block diagram illustrating an example electronic environment for carrying out the improved technique.

FIG. 1 illustrates an example electronic environment 10 for carrying out the improved technique. Electronic environment 10 includes storage processor 12, original storage system 14, secondary storage system 26, communications medium 18, and client 22.

Communication medium 18 provides network connections between storage processor 12 and client 22. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Storage processor 12 is constructed and arranged to detect corrupted data 20 in original storage system 14 and initiate FSCK for repairing corrupted data 20. Storage processor 12 is also constructed and arranged to bring file system 16 offline after detecting corrupted data 20 and before initiating FSCK. Storage processor 12 is further constructed and arranged to write repairs to corrupted data in secondary storage system 26. Storage processor 12 is further constructed and arranged to provide read-only access to file system 16 upon receiving a request to access files in file system 16. As depicted, storage processor 12 is a server; nevertheless, in some arrangements, storage processor 12 may be a personal computer, a laptop, or the like.

Original storage system 14 is configured to make file content available to client 22 upon receiving request 32. Original storage system 14 includes a set of disks 24 on which files are stored and original file system 16 which provides a map between filenames, file content, and metadata for the files.

Secondary storage system 26 is configured to store repaired data during a run of FSCK on original storage system 14. Secondary storage system 26 includes a set of disks 30 on which repaired data are stored.

Client 22 is configured to access files stored in original storage system 14 via storage processor 12. Client 22 is a desktop computer, although in some arrangements, client 22 may be a server, a laptop, a mobile device, or the like having a processor and an ability to access files over a network.

During operation, storage processor 12 detects corrupted data 20 within original file system 16. In many cases, corrupted data 20 is missing or inconsistent metadata corresponding to files within file system 16. In some arrangements, corrupted data 20 may include LUN and/or memory corruptions. Storage processor 12 may come across corrupted data 20 in the course of performing consistency checks on the metadata stored in inodes on disks 24.

Upon detecting corrupted data 20, storage processor 12 brings file system 16 offline. In doing so, client 22 may not access files in file system.

Storage processor 12, after bringing file system 16 offline, initiates a repair operation by running FSCK on original file system 16. Storage processor invokes FSCK with read-only access to file system 16. Upon initiating this repair operation, storage processor 12 becomes configured to store subsequent writes from the run of FSCK to file system 16 in disks 30 of secondary storage system 26.

Client 22, at some subsequent time, sends a request 32 to access a file stored in storage system 14 to storage processor 12 via communications medium 18 while storage processor 12 runs FSCK on file system 16. In some arrangements, request 32 includes a filename by which storage processor 12 looks up a directory entry in file system 16 to get an inode number indicating where in disks 24 the inode for the file is located. From the directory entry, storage processor 12 extracts an inode number for the file that produces a location of the inode for the file in disks 24. While FSCK runs, storage processor 12, while delivering the file to client 22 all the same, delivers that file with read-only permissions. That is, client 22 may not write to disks 24 via that file.

While FSCK runs, however, storage processor 12 writes repairs of corrupted data to disks 30 of secondary storage system 26 because FSCK was invoked with read-only access to file system 16. In order that storage processor 12 is able to track which blocks have been updated so that FSCK may write back to disks 24 the corrected blocks, storage processor 12 creates a bitmap (see FIGS. 2 and 3) that records which blocks in disks 24 were repaired and are being stored in disks 30 while FSCK runs.

Figure 2:
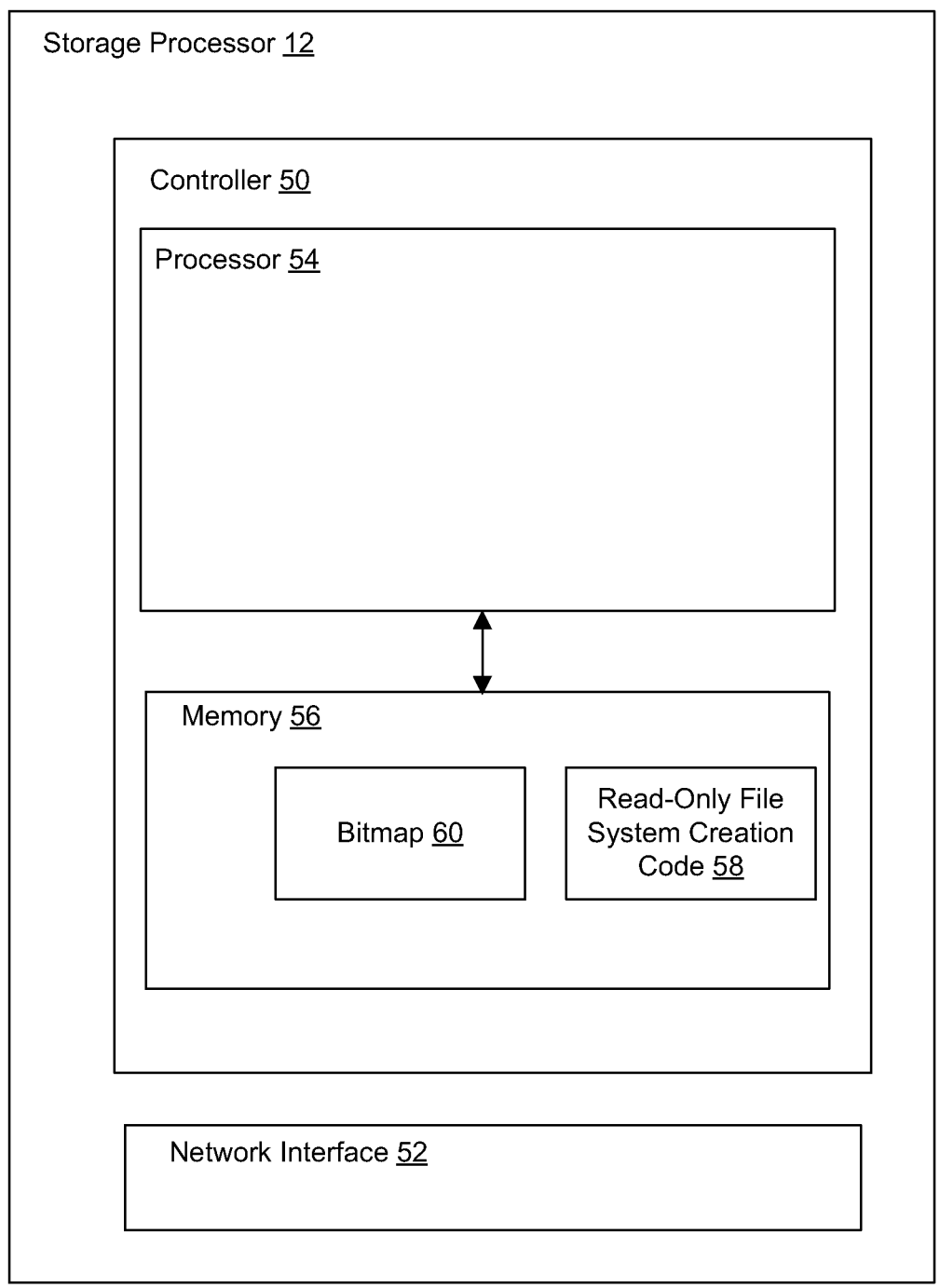
FIG. 2 is a block diagram illustrating an example storage processor within the electronic environment shown in FIG. 1.

FIG. 2 illustrates details of an example storage processor 12. Storage processor 12 includes controller 50, which in turn includes processor 54 and memory 56, and network interface 52.

Network interface 52 takes the form of an Ethernet card; in some arrangements, network interface 52 takes other forms including a wireless receiver and a token ring card.

Memory 56 is configured to store code 58 that contains instructions configured to cause the processor to carry out the improved technique. Memory 56 generally takes the form of, e.g., random access memory, flash memory or a non-volatile memory. Memory 58 includes read-only file system creation code 58, which serves to set permissions of all files of file system 16 to read-only. In some arrangements, memory 56 also includes bitmap 60 which is configured to provide a tabulation of blocks in disks 24 (see FIG. 1) that have been repaired.

Further details of bitmap 60 are discussed below with respect to FIG. 3.

Processor 54 takes the form of, but is not limited to, Intel or AMD-based MPUs, and can include a single or multi-cores each capable of running single or multiple threads. In some arrangements, processor 54 is one of several processors working together. Processor 54 is configured to apply read-only permissions to files of file system 16 (see FIG. 1) and write repairs of corrupted data to disks 30 of secondary storage system 26.

Figure 3:
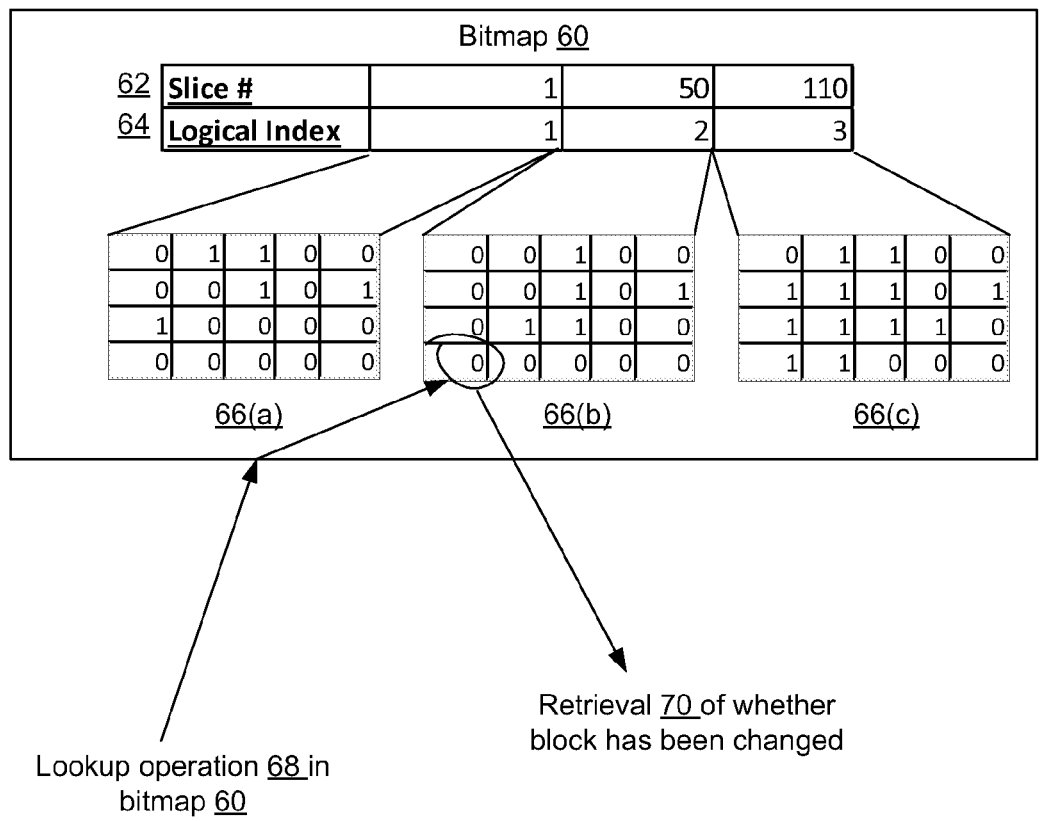
FIG. 3 is a block diagram illustrating an example mapping table within the electronic system shown in FIG. 1.

FIG. 3 illustrates an example bitmap 60 stored in memory 56 of storage processor 12. Bitmap 60 includes a slice number 62 that refers to the slice in which blocks of disks 24 reside. It should be understood that a slice of a volume is a piece of a volume or LUN used to create more manageable units of data. Because not all slices are typically represented in the repair, each slice represented in bitmap 60 is assigned a logical index number 64 for reference. In some arrangements, however, logical index number 64 is not present, and reference is made solely to slice number 62.

For each logical index number 64, there is a series of bits 66(a), 66(b), and 66(c), each bit representing a block within a slice of disks 24. Processor 54 sets a bit representing a particular block in a slice 62 to a first value, e.g., "0" when there has been no repair done on data in that block, while processor 54 sets that bit to a second value, e.g., "1" when there has been a repair made to data in that clock.

It should be understood that repaired data is typically metadata for files of file system 16.

During operation, processor 54 takes file system 16 offline in recognition that the repair operation has finished and FSCK will write the repaired data back to disks 24. Along these lines, processor 54 locates blocks on which the metadata for the file is stored. Processor 54 then performs a lookup operation 68 on bitmap 60, first by slice, and then by block. The lookup verifies 70 whether the block (or blocks) in which the metadata is stored has been changed by FSCK. If that block has been changed, then processor 54 writes that block back to disks 24 according to the bitmap.

In some arrangements, bitmap 60 is too large to be completely stored in memory 56. In such a case, processor 54 produces a swap space (not pictured) in disks 30 (i.e., a virtual memory) in which bitmap 60 is stored. Processor 54 records the location of the beginning of bitmap 60 within the swap space so that lookup operation 68 may be carried out. Bitmap 60 is stored completely in the swap space, although in some arrangements, bitmap 60 is split between memory 56 and the swap space.

Further details of the improved technique are described below with respect to FIG. 4.

Figure 4:
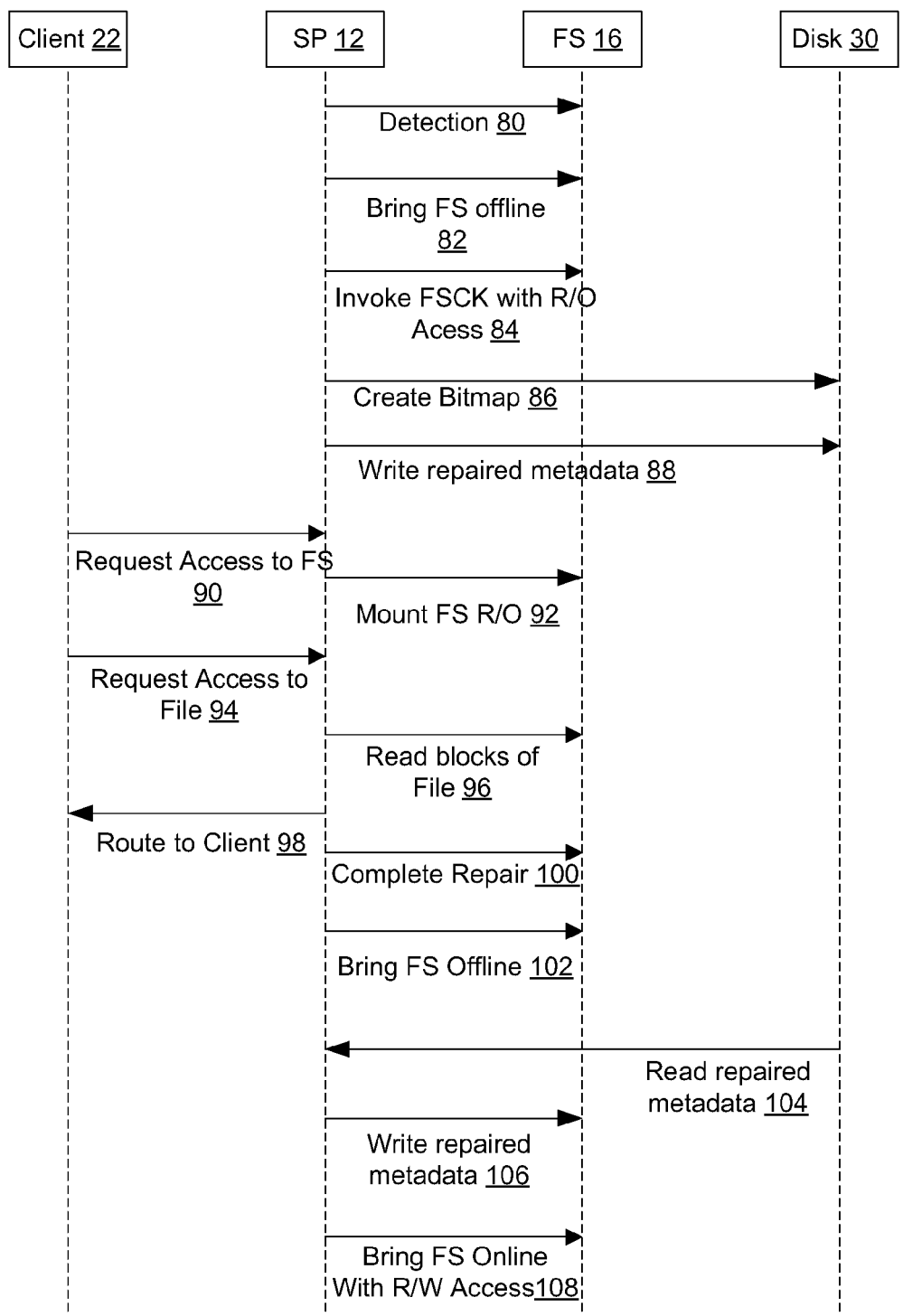
FIG. 4 is a sequence diagram illustrating an example file system check procedure within the electronic system shown in FIG. 1.

FIG. 4 is a sequence diagram illustrating an example process of providing read-only access to files while running FSCK. The process begins with a detection 80 on part of storage processor 12 of a corruption in disks 24. Upon detection 80, storage processor 12 brings file system 16 offline 82 as described above.

Storage processor 12 then invokes 84 FSCK with read-only access as described above.

Once FSCK has been invoked, storage processor creates 86 a bitmap in memory 56 as a contiguous space representing blocks of data within each stripe of disks 24. Bitmap 60 is contiguous so that storage processor 12 may perform lookups quickly. Initially, the bits of bitmap 60 are all labeled "0" to signify that no changes to the blocks have been written to disks 30. As FSCK runs and writes to blocks of data in disks 30, storage processor 12 marks the bit corresponding to that block as "1". It should be understood that, if all bits of a slice are set to "0", then that slice is omitted from bitmap 60.

In the meantime, storage processor 12 writes 88 corrupted metadata to disks 30 for repair.

During repair, storage processor 12 receives a request 90 from client 22 to access file system 16. Upon receiving request 90, storage processor 12 mounts 92 file system 16 with read-only access. Client 22 then sends 94 a request for access to a file on file system 16. Upon receiving request 94, storage processor 12 reads (step 96) blocks in disks 24 corresponding to that file, which blocks were provided by an inode table. Storage processor 12 then sends (step 98) a read-only copy of that file to client 22.

At some point in time, FSCK completes (step 100) its run on storage system 14. At this point, storage processor 12 takes file system 16 offline and temporarily blocks 100 any requests for access to files stored in disks 24. Storage processor 12 then locates repaired blocks from bitmap 6, reads repaired metadata 102 on disks 30, and writes that repaired metadata back to disks 24. Once storage processor 12 has written the repaired metadata back to disks 24, storage processor 12 places file system 16 back online. That is, future requests 104 are unblocked and routed back to file system 16 as was the case prior to detection of corrupted data 20.

Figure 5:
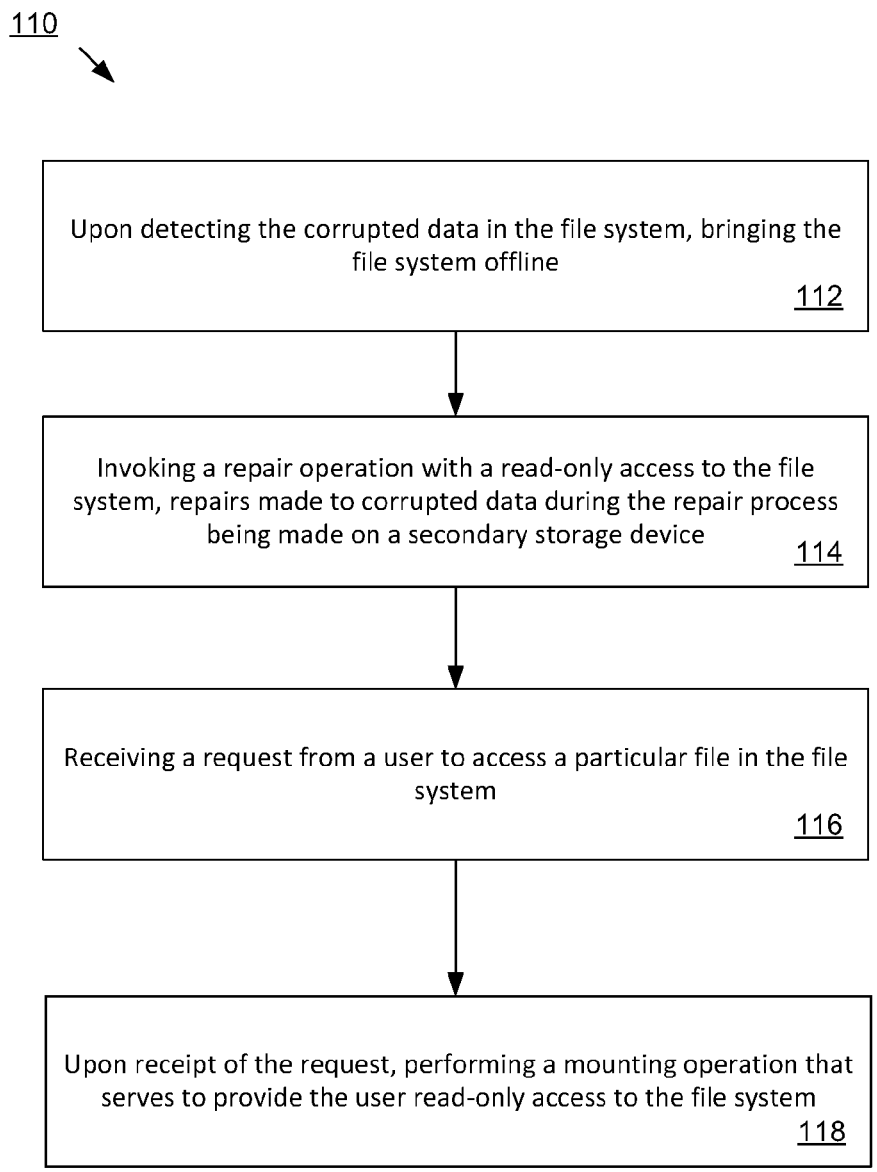
FIG. 5 is a flow chart illustrating a method of carrying out the improved technique within the electronic environment shown in FIG. 1.

FIG. 5 illustrates a method 110 of repairing corrupted data in a file system in response to detecting the corrupted data, including steps 112, 114, 116, and 118. In step 112, code 58 brings the file system offline upon detecting the corrupted data in the file system. In step 114, a repair operation is invoked with a read-only access to the file system, repairs made to corrupted data during the repair process being made on a secondary storage device. In step 116, a request is received from a user to access a particular file in the file system. In step 118, a mounting operation is performed that serves to provide the user read-only access to the file system.

While various embodiments of the invention have been particularly shown and described, it will be understood by those skilled in the art that various changes in form and details may be made therein without departing from the spirit and scope of the invention as defined by the appended claims.

For example, the storage processor 12 described above keeps the original file system 16 on disks 24 while repair occurs. In some arrangements, however, storage processor 12 makes a read-only copy of file system 16 and stores this read-only copy on disks 30. Requests for access to a file in file system 16 are then routed to the copy.

Moreover, although two storage systems were described above, the improved technique could be accomplished on a single storage system. Further, the repaired corrupted data could be stored on that same disk, albeit in a different partition of the disk.

Furthermore, it should be understood that some embodiments are directed to storage processor 12, which is constructed and arranged to repair corrupted data in a file system in response to detecting the corrupted data. Some embodiments are directed to a process of repairing corrupted data in a file system in response to detecting the corrupted data. Also, some embodiments are directed to a computer program product which enables computer logic to repair corrupted data in a file system in response to detecting the corrupted data.

In some arrangements, storage processor 12 is implemented by a set of processors or other types of control/processing circuitry running software. In such arrangements, the software instructions can be delivered, within storage processor 12, in the form of a computer program product, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-implemented method of repairing corrupted data in a file system of a primary storage device in response to detecting the corrupted data, the method comprising:
   upon detecting the corrupted data in the file system, bringing, by a storage processor device, the file system offline;
   invoking, by the storage processor device, a repair operation with a read-only access to the file system, repairs made to corrupted data during the repair process being made on a secondary storage device;
   receiving, by the storage processor device, a request from a user to access a particular file in the file system; and
   upon receipt of the request, performing, by the storage processor device, a mounting operation that serves to provide the user read-only access to the particular file in the file system.

2. A method as in claim 1, further comprising:
   during the repair operation and after performing the mounting operation:
      performing a read operation on the particular file; and
      sending the user a read-only copy of the particular file in response to receipt of the request.

3. A method as in claim 2, further comprising:
   upon completion of the repair operation, bringing the file system offline;
   while the access is blocked, writing the changes to the corrupted data stored on the secondary storage onto the primary storage device; and
   after the changes to the corrupted data are written to the primary storage device, restoring access to the files of the file system.

4. A method as in claim 3, further comprising:
generating a bitmap that serves to identify blocks on the secondary storage device in which the corrupted data is stored and repaired, each bit of the bitmap corresponding to a block of the primary storage device;
wherein writing the changes to the corrupted data stored on the secondary storage onto the primary storage device includes:
performing a lookup operation on the bitmap to find the blocks on the secondary storage device in which the corrupted data is stored and repaired.

5. A method as in claim 4,
wherein generating the bitmap includes:
storing the bitmap in memory.

6. A method as in claim 4,
wherein generating the bitmap includes:
creating a swap space on the secondary device; and
storing the bitmap in the swap space.

7. A method as in claim 4,
wherein generating the bitmap includes:
identifying a slice of the primary storage device on which the corrupted data is stored;
writing a slice identifier indicative of the slice to the bitmap, the slice identifier marking a section of the bitmap for blocks within the slice; and
writing a "0" in a bit corresponding to a block within the slice when that block contains data that has not been changed; and
writing a "1" in a bit corresponding to a block within the slice when that block contains data that has been changed.

8. A method as in claim 1, further comprising, during the repair operation and after performing the mounting operation, performing a read operation on the particular file.

9. A method as in claim 8, further comprising:
upon completion of the repair operation, bringing the file system offline again;
while the file system is offline again, writing the changes to the corrupted data stored on the secondary storage onto the primary storage device; and
after the changes to the corrupted data are written to the primary storage device, bringing the file system online to provide read and write access to the files of the file system.

10. A method as in claim 9, further comprising:
generating a bitmap that identifies blocks on the secondary storage device in which the corrupted data is stored and repaired, each bit of the bitmap corresponding to a block of the primary storage device;
wherein writing the changes to the corrupted data stored on the secondary storage onto the primary storage device includes:
performing a lookup operation on the bitmap to find the blocks on the secondary storage device in which the corrupted data is stored and repaired.

11. An apparatus constructed and arranged to repair corrupted data in a file system in response to detecting the corrupted data, the apparatus comprising:
a network interface;
memory; and
a controller including controlling circuitry, the controlling circuitry being constructed and arranged to:
upon detecting the corrupted data in the file system, bring the file system offline;
invoke a repair operation with a read-only access to the file system, repairs made to corrupted data during the repair process being made on a secondary storage device;
receive a request from a user to access a particular file in the file system; and
upon receipt of the request, perform a mounting operation that serves to provide the user read-only access to the particular file in the file system.

12. An apparatus as in claim 11, wherein the controlling circuitry is further constructed and arranged to:
during the repair operation and after performing the mounting operation:
perform a read operation on the particular file; and
send the user a read-only copy of the particular file in response to receipt of the request.

13. An apparatus as in claim 12, wherein the controlling circuitry is further constructed and arranged to:
upon completion of the repair operation, bring the file system offline;
while the access is blocked, write the changes to the corrupted data stored on the secondary storage onto the primary storage device; and
after the changes to the corrupted data are written to the primary storage device, restore access to the files of the file system.

14. An apparatus as in claim 13, wherein the controlling circuitry is further constructed and arranged to:
generate a bitmap that serves to identify blocks on the secondary storage device in which the corrupted data is stored and repaired, each bit of the bitmap corresponding to a block of the primary storage device;
wherein writing the changes to the corrupted data stored on the secondary storage onto the primary storage device includes:
performing a lookup operation on the bitmap to find the blocks on the secondary storage device in which the corrupted data is stored and repaired.

15. An apparatus as in claim 14,
wherein generating the bitmap includes:
storing the bitmap in memory.

16. An apparatus as in claim 14,
wherein generating the bitmap includes:
creating a swap space on the secondary device; and
storing the bitmap in the swap space.

17. An apparatus as in claim 14,
wherein generating the bitmap includes:
identifying a slice of the primary storage device on which the corrupted data is stored;
writing a slice identifier indicative of the slice to the bitmap, the slice identifier marking a section of the bitmap for blocks within the slice; and
writing a "0" in a bit corresponding to a block within the slice when that block contains data that has not been changed; and
writing a "1" in a bit corresponding to a block within the slice when that block contains data that has been changed.

18. A computer program product having a non-transitory, computer-readable storage medium which stores code for repairing corrupted data in a file system in response to detecting the corrupted data, the code including instructions which, when executed by a computer, cause the computer to:
upon detecting the corrupted data in the file system, bring the file system offline;

invoke a repair operation with a read-only access to the file system, repairs made to corrupted data during the repair process being made on a secondary storage device;

receive a request from a user to access a particular file in the file system; and upon receipt of the request, perform a mounting operation that serves to provide the user read-only access to the particular file in the file system.

19. A computer program product as in claim 18, wherein the code includes further instructions which, when executed by a computer, cause the computer to:

during the repair operation and after performing the mounting operation:
perform a read operation on the particular file; and
send the user a read-only copy of the particular file in response to receipt of the request.

20. A computer program product as in claim 19, wherein the code includes further instructions which, when executed by a computer, cause the computer to:

upon completion of the repair operation, bring the file system offline;

while the access is blocked, write the changes to the corrupted data stored on the secondary storage onto the primary storage device; and after the changes to the corrupted data are written to the primary storage device, restore access to the files of the file system.

21. A computer program product as in claim 20, wherein the code includes further instructions which, when executed by a computer, cause the computer to:

generate a bitmap that serves to identify blocks on the secondary storage device in which the corrupted data is stored and repaired, each bit of the bitmap corresponding to a block of the primary storage device;

wherein writing the changes to the corrupted data stored on the secondary storage onto the primary storage device includes:
performing a lookup operation on the bitmap to find the blocks on the secondary storage device in which the corrupted data is stored and repaired.

22. A computer program product as in claim 21, wherein generating the bitmap includes:
storing the bitmap in memory.

23. A computer program product as in claim 21, wherein generating the bitmap includes:
creating a swap space on the secondary device; and
storing the bitmap in the swap space.

* * * * *